United States Patent [19]

Blank et al.

[11] Patent Number: 4,514,756
[45] Date of Patent: Apr. 30, 1985

[54] SINGLE BEAM COLOR CRT

[75] Inventors: Stuart L. Blank, Madison; Eugene I. Gordon, Convent Station, both of N.J.

[73] Assignee: AT&T Bell Laboratories, Murray Hill, N.J.

[21] Appl. No.: 468,502

[22] Filed: Feb. 22, 1983

[51] Int. Cl.³ .......................... H04N 9/22; H04N 9/27
[52] U.S. Cl. .......................................... 358/66; 358/67
[58] Field of Search ...................... 358/43, 46, 66, 67, 358/68, 69, 72, 73, 74; 350/167; 315/30, 369, 383

[56] References Cited

U.S. PATENT DOCUMENTS

| 3,781,465 | 12/1973 | Ernstoff | 358/66 |
| 3,790,405 | 2/1974 | Levinstein | 117/201 |
| 3,851,093 | 11/1974 | Sunstein | 358/67 |
| 4,183,053 | 1/1980 | Tomii | 358/69 |
| 4,369,396 | 1/1983 | Judd | 358/68 |

FOREIGN PATENT DOCUMENTS

| 75226 | 6/1977 | Japan | 358/67 |
| 800641 | 8/1958 | United Kingdom | 358/67 |
| 999649 | 7/1965 | United Kingdom | 358/66 |

OTHER PUBLICATIONS

S. Sherr, "Electronic Display Cathode-Ray Devices", Electronic Displays, pp. 113–130, (1979).

H. J. Levinstein, S. Licht, R. W. Landorf and S. L. Blank, "Growth of High-Quality Garnet Thin Films from Supercooled Melts", Applied Physics Letters, vol. 19, No. 11, pp. 486–487, (1971).

Primary Examiner—Tommy P. Chin
Attorney, Agent, or Firm—Michael J. Urbano

[57] ABSTRACT

The target of a CRT comprises a single crystal substrate (e.g., YAG) on which are formed a plurality of color stripe triads of epitaxial material. Each stripe triad has three epitaxial layers in a staircase geometry and is overlayed with a metal stripe. The metal stripes are the fingers of a pair of interdigitated electrodes. A single e-beam scans the stripes horizontally, and a sequence of current pulses generated in the electrodes precisely defines the horizontal position of the beam relative to the triads. This information is used to precisely time the beam modulation for introducing color signals. The CRT is particularly suited to miniaturization and application in projection systems.

6 Claims, 3 Drawing Figures

SINGLE BEAM COLOR CRT

BACKGROUND OF THE INVENTION

This invention relates to color cathode ray tubes (CRTs) and, more particularly, to miniature color CRTs in which the target is addressed by a single electron beam (e-beam). These CRTs are suitable for projection display systems.

As discussed by S. Sherr in a book entitled, *Electronic Displays*, John Wiley and Sons, (1979), the color CRT has undergone considerable development because of its extensive use in home entertainment television. Although the designs have been satisfactory for that application, they are not adequate for all information display systems, particularly projection display systems.

Color CRTs can be divided into two major categories: those which utilize three e-beams, one to generate each primary color; and those which utilize a single e-beam to generate all of the primary colors. The most successful color CRT, and that adopted by the majority of the television manufacturers, utilizes the three beam technique to address color triads on a phosphor screen. A shadow mask, consisting of a plate having circular apertures, is interposed between the screen and the electron guns, which are arranged side by side. The three beams follow slightly different paths which converge to a focus on the shadow mask aperture. The arrangement is designed so that the beam corresponding to the desired color strikes only the phosphor dot of the triad producing that color. All three beams are deflected together with a single yoke, and the electrostatic focus elements for the three guns are connected in parallel so that a single focus control is sufficient.

Even if perfect alignment of the masks and phosphor triads is assumed, the CRT is still subject to certain limitations of resolution and luminance according to Sherr. The resolution restriction arises from the necessity to align the mask apertures and the phosphor dot triads, so that the mask aperture size controls the obtainable resolution. In addition, misalignment and misregistration of the three beams leads to loss of purity for colors produced by combinations of the primary colors as well as some reduction in luminance due to a smaller part of the beams passing through the apertures. Moreover, dynamic focusing becomes very important and adds to the cost and long-term instability of the focus.

One improvement in color CRTs has been the in-line gun in which three electron guns are placed in a line perpendicular to the axis and the shadow mask grid. The resulting beams are directed through a striped grid onto a screen consisting of parallel stripes of color phosphors in alternating red, green, and blue triplets. Since a single lens with a large diameter is used, aberrations are kept smaller, and smaller spot sizes may be achieved compared to conventional guns. The in-line guns also simplify convergence, and the transmission of the stripe apertures is considerably better than that of the conventional shadow mask apertures.

Another attempt to improve on the performance of the shadow mask color CRT involves the use of a single e-beam to address the color triads. Consequently, some form of beam indexing is used to determine the precise position of the scanning beam reative to the triad. In the pilot beam version, described at page 123 by Sherr, the electron gun contains a single cathode and means for splitting up the electrons into two beams. The primary beam generates color in the usual fashion, and the pilot beam is used to determine the position of the primary beam. The color phosphors are parallel stripes, and behind the red phosphor stripes are secondary emission index stripes. A particular frequency mixing scheme is used to determine when the primary color beam is at the red phosphor stripe, with the other colors coming at fixed periods in relation to that time. The system, however, imposes too many severe requirements on the structure of the CRT to be practical and has been abandoned after several years of intense development.

Another beam index tube has been developed using UV phosphor index stripes in place of the secondary emission index stripes described above. Once again, the target includes blue, red, and green striped triads with the index stripes located between alternate pairs of color stripes. A photomultiplier is used to detect the UV emission generated when the e-beam is incident on an index stripe. Again, this index signal must be mixed with a chrominance signal in a manner similar to the secondary emission version to produce a chrominance component of the video signal applied to the CRT grid. This approach has the advantage that only a single beam is needed and that the index current becomes zero when the beam leaves the index stripe. However, according to Sherr, most of the other problems found in the construction of the pilot beam tube remain.

Another approach to the production of a color image on a CRT, without requiring either multiple beams, masks or index stripes, is the beam penetration tube. This color CRT is based on the principle that the depth of penetration of an e-beam into a phosphor is proportional to the difference between the square of the initial electron energy and the square of the remaining electron energy after penetration to a particular depth. Thus, a single e-beam and a multilayer phosphor may be used to generate the different colors, eliminating the need for masks or grids to ensure that the proper beam hits the correct phosphor. This CRT, however, is limited by the circuit complexity required to switch high voltages at relatively high rates of speed. Normal accelerating voltages range from 6 kV for red to about 12 kV for green. In order to switch colors at television rates, it is necessary to change the voltage in about 100 nsec (assuming standard sweep rates and horizontal resolution, with a single sweep time of 60 $\mu$sec, and 480 resolution elements in one sweep time). The actual number is not very important since switching 6 kV into a capacitance of 100 pF or larger is a formidable task requiring high power radar techniques according to Sherr. Such tubes are proving to be useful for color graphics where the color of interest is changed only infrequently. However, despite intense development, they are not useful for color television.

SUMMARY OF THE INVENTION

In accordance with one aspect of our invention, the target for a miniature CRT includes a plurality of color stripe triads, each triad having a staircase geometry and being overlayed with a metal stripe. The metal stripes are the fingers of a pair of interdigitated electrodes. A single e-beam scans the stripes horizontally, and a sequence of current pulses generated in the electrodes is used to precisely define the horizontal position of the beam relative to the triads. This information is used to time the beam modulation for introducing color signals.

In a preferred embodiment, the triads comprise single crystal phosphors, such as suitably doped epitaxial layers of YAG, which allow the use of two-step photolithography for defining the stripes. This feature is most convenient for the miniature geometry employed. In addition, the capacitance of the interdigitated electrode structure is low enough for the miniature geometry so as not to be a problem for the video frequencies involved.

BRIEF DESCRIPTION OF THE DRAWINGS

Our invention, together with its various features and advantages, can be readily understood from the following, more detailed description taken in conjunction with the accompanying drawing, in which.

DETAILED DESCRIPTION

Figure 1:
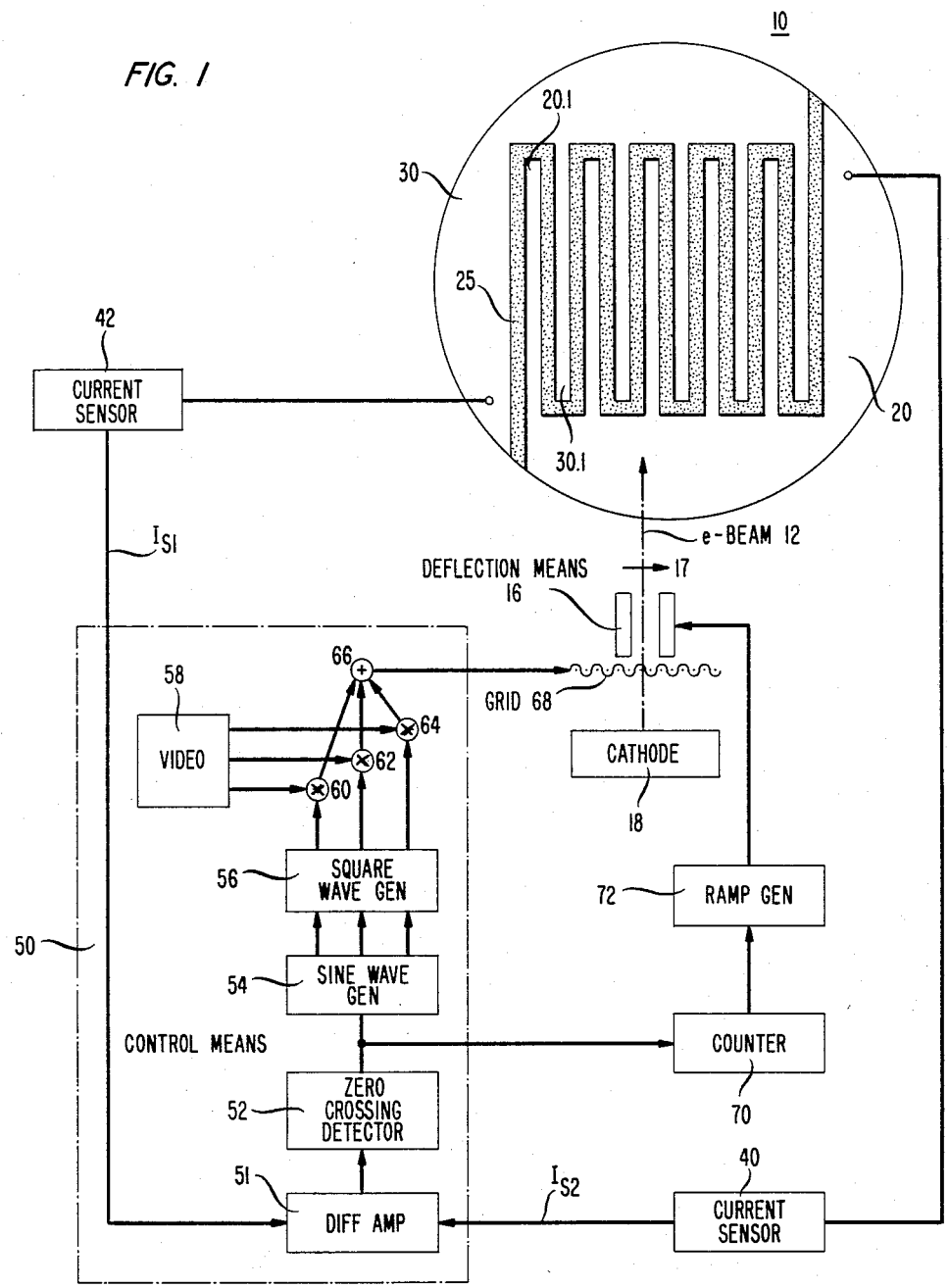
FIG. 1 is a schematic of CRT apparatus in accordance with one embodiment of our invention.
Figure 2:
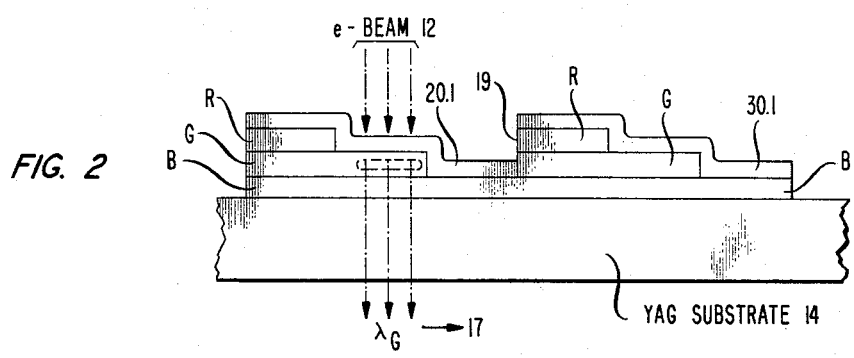
FIG. 2 is a cross-sectional view (without cross-hatching) of a preferred target for use in the CRT of FIG. 1.

With reference now to FIG. 1, there is shown CRT apparatus in accordance with one aspect of our invention including a color target 10 which is scanned by a single e-beam 12. The target, as shown in FIG. 2, comprises a plurality of color stripe triads: R for generating red light, G for generating green light, and B for generating blue light. These stripes are arranged on a substrate 14 in a staircase geometry so that, as viewed by the e-beam 12, they appear as side-by-side color stripes. The particular arrangement with the red stripe on top and the blue stripe on the bottom is illustrative only—any sequence of the three primary colors is suitable.

Overlaying each stripe triad is a metal layer. Two metal layers designate 20.1 and 30.1 are depicted in FIG. 2 as overlaying adjacent triads. The plurality of such metal layers form the fingers of a pair of interdigitated electrodes 20 and 30 as shown in FIG. 1. Note that a serpentine gap 25 is depicted in FIG. 1 for clarity of illustration only. In practice, the top view of the target might not show such a gap because, as shown in FIG. 2, the only separation between adjacent fingers is in the direction perpendicular to substrate 14 (i.e., along interface 19).

By means described later, the e-beam 12 is modulated with video (color) information and made to scan horizontally (i.e., transversely) across the fingers of electrodes 20 and 30 in the direction, for example, of arrow 17. The metal layers do not stop the electrons which penetrate into the phosphor stripes R, G, and B. The e-beam energy is chosen, however, so that the electrons are absorbed in only the uppermost color stripe. Thus, the beam produces only a single primary color at a time (i.e., in a given beam position). For example, in FIG. 2 for the beam position shown, the electrons are absorbed in the green stripe G and generate light of wavelength $\lambda_G$, but they do not have enough energy to penetrate into the underlying blue stripe B. The light intensity is modulated by modulating the e-beam current as is well known in the art.

Although the substrate 14 is electrically insulating, the electrons instantly leak back to the overlying metal layer (layer 20.1 for the illustrative beam position of FIG. 2). By monitoring this leakage current to the interdigitated electrodes 20 and 30, current sensors 40 and 42 generate a sequence of current pulses. Control means 50 is responsive to these current pulses for precisely defining the horizontal position of e-beam 12 relative to the triads. An important feature of this aspect of our invention is that the sensor outputs are used to generate a zero-crossing signal which is independent of the level of the beam current and hence independent of the video signal. The zero-crossing signal, in turn, is used to time beam modulation for introducing color signals.

More specifically, as the e-beam 12 scans across the interdigitated electrodes, it generates a current $I_{S1}$ from electrode 30 and $I_{S2}$ from electrode 20. The waveforms for $I_{S1}$ and $I_{S2}$ are shown, respectively, in parts (a) and (b) of FIG. 3. Note that these waveforms constitute pulse trains which are 180° out of phase with one another, and in practice the amplitude of the pulses would correspond to the amplitude of the video signal color samples. The sum of these currents equals the beam current less the secondary electron emission current, which is typically small at the relatively high beam voltages employed (e.g., 25 kV). However, only when the beam is precisely centered on the interface 19 (FIG. 2) between adjacent fingers is the beam current in each of those fingers identical. This fact is exploited by feeding the currents $I_{S1}$ and $I_{S2}$ into a balanced difference amplifier 51. The output of amplifier 51 is a zero-crossing signal $I_{S1}-I_{S2}$ shown in part (c) of FIG. 3. This difference signal is applied to a zero-crossing detector 52 which generates a train of timing pulses shown in part (d) of FIG. 3. These pulses have a period T and correspond precisely to the instants at which the beam crosses from one triad to the next. Importantly, this timing signal is derived only from the zero-crossing of the difference signal and is independent of the amplitude level (i.e., video modulation) of the beam current.

Figure 3:
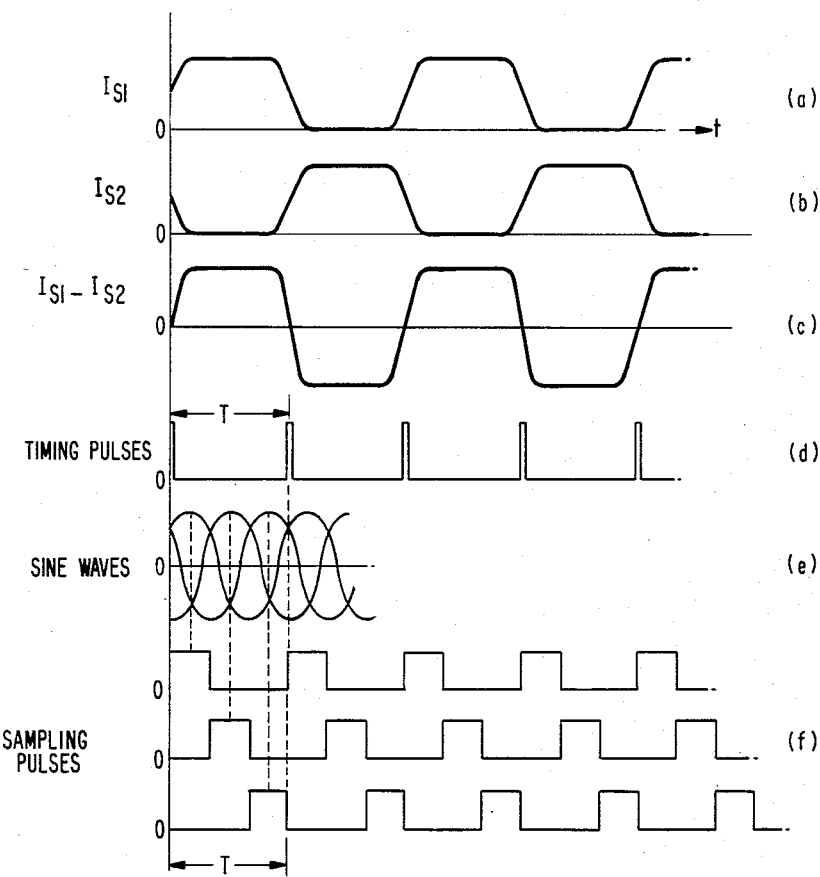
FIG. 3 illustrates signal waveforms generated by the apparatus of FIG. 1: (a) and (b) are the current outputs of sensors 42 and 40, respectively; (c) is the difference signal generated by difference amplifier 51; (d) shows the timing pulses generated by zero-crossing detector 52; (e) depicts the sine waves at the output of generator 54; and (f) shows the sampling pulses at the output of square wave generator 56.

The timing pulses at the output of the zero-crossing detector 52 are fed into a sine wave generator 54 in order to generate within each interval T three sine waves which are 120° out of phase with one another and which have a period equal to T, as shown in part (e) of FIG. 3. In practice, the timing pulses could, for example, serve as the input to a phase delay circuit in generator 54. These phase delayed sine waves are then converted by square wave generator 56 into trains of sampling pulses on three parallel output lines of generator 56. As shown in part (f) of FIG. 3, there are three sampling pulses in each period T and, as with sine waves, the pulse trains are 120° out of phase with one another.

These sampling pulses are used to sample the red, green and blue analog color signals supplied by video circuit 58. Sampling circuits are well known in the art and are illustratively depicted in FIG. 1 as multipliers 60, 62, and 64 used, respectively, to sample the red, green, and blue video signals. The three primary color samples retain the 120° phase delay and are combined by means of adder circuit 66 to supply an analog modulation signal to the grid 68 of the CRT. Of course, this modulation signal varies the beam current which, in turn, varies the intensity of the light output.

The output of the zero-crossing detector 52 is also used to control the horizontal deflection means 16. The timing pulses at the output of detector 52 are counted in counter 70 and used to control the duration of the sawtooth output waveform of ramp generator 72 as is well known in the art.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particlar, a preferred embodiment of our invention incorporates the foregoing features in a high resolution, high brightness miniature CRT which is useful, for example, in a projection CRT system. The target 10 comprises a YAG substrate 14 on which are epitaxially grown three YAG layers, each one producing a primary color for use in color display. These layers are then etched, or otherwise suitably shaped, to form the staircase configuration of FIG. 2. Finally, the interdigitated electrodes 20 and 30 are deposited so that the fingers of electrodes cover the triads as in FIG. 2. Aluminum is a suitable material for the electrodes. To generate primary colors the following compositions are illustrative: the R layer comprises Eu:YAG, the G layer comprises Ce:YAG, and the B layer comprises Tm:YAG all of which may be grown on an undoped YAG substrate by the epitaxial technique generally described in H. J. Levinstein, S. J. Licht, R. W. Landorf, and S. L. Blank, *Applied Physics Letters,* Vol. 19, p. 486 (1971). Although this paper describes the growth of the magnetic material GGG, essentially the same method is used to fabricate YAG. See also, U.S. Pat. No. 3,790,405 granted to H. J. Levinstein on Feb. 24, 1974.

The miniature CRT tube itself is illustratively about 8.5–9 inches long and has a target face diameter of about 2 inches. The YAG substrate of the target is about 75 mils thick whereas the triad stripes have a width (i.e., step width) of about 0.9 mils, a length of about 1.1 inches, and a thickness (each layer) of about 4 $\mu$m. About 1500 triads are formed on the target face. For this structural configuration a typical set of operating parameters is: brightness 7000–15,000 ft. lamberts; resolution <2 mils; beam current 1 mA; and anode voltage 25 kV.

What is claimed is:

1. Color CRT apparatus comprising
   a target including a plurality of triads each including three adjacent stripes of material for generating primary colors of light when excited by an e-beam, and
   means for scanning a single e-beam across the triads to generate said light, characterized by
   adjacent stripes of each of said triads having a staircase geometry,
   a pair of interdigitated electrodes having fingers each of which overlays and contacts three adjacent stripes of separate ones of said triads, said beam generating trains of current pulses from said electrodes, and
   control means responsive to said current pulse trains for modulating said e-beam so as to modulate the intensity of said light.

2. The apparatus of claim 1 wherein each of said triads comprises adjacent stripes of single crystal YAG material.

3. Color CRT apparatus comprising
   a target including a plurality of triads each including three adjacent stripes of material for generating primry colors of light when excited by an e-beam, and
   means for scanning a single e-beam across the triads to generate said light, characterized by
   a pair of interdigitated electrodes having fingers which overlay said triads, said beam generating trains of current pulses from said electrodes,
   control mans responsive to said current pulse trains for modulating said e-beam so as to modulate the intensity of said light wherein said control means includes
   sensing means responsive to said trains of current pulses from said electrodes for generating a pair of current pulse trains which are 180° out of phase with one another,
   comparator means for generating a signal corresponding to the difference between said pair of pulse trains,
   detector means for generating a train of timing pulses of periodicity T corresponding to the zero-crossings of said difference signal,
   means responsive to said timing pulses for generating in each period T three sampling pulses 120° out of phase with one another,
   sampling means responsive to said sampling pulses for generating analog samples of three primary color video signals, and
   means responsive to said samples for modulating said e-beam so as to modulate the intensity of said light.

4. A target for use in a color CRT comprising
   a plurality of triads each including three adjacent stripes of material for generating primary colors of light when excited by an e-beam, adjacent stripes of each of said triads having a staircase geometry, and
   a pair of interdigitated electrodes having fingers each of which overlays and contacts three adjacent stripes of separate ones of said triads.

5. The target of claim 4 wherein said material comprises single crystal YAG.

6. The target of claim 5 including a single crystal YAG substrate and wherein said stripes comprise epitaxial layers grown on said substrate so that each layer of each triad includes a different phosphor for generating a different primary color.

* * * * *